United States Patent Office 2,994,702
Patented Aug. 1, 1961

---

2,994,702
2-(p-CARBOXYBENZENE-SULFONYLAMINO)-4-METHYL-5-SULFAMYL THIAZOLE
James M. Sprague, Gwynedd Valley, and Carl Ziegler, Glenside, Pa., assignors to Merck & Co., Inc., Rahway, N.J., a corporation of New Jersey
No Drawing. Filed Apr. 6, 1959, Ser. No. 804,070
1 Claim. (Cl. 260—306.8)

This invention relates to novel substituted amino sulfamylthiazoles and alkali metal salts thereof, which have the structural formula:

$$\begin{array}{c} S\text{———}C-SO_2NH_2 \\ |\ 1\quad\ 5\| \\ X-N-C2\quad 4C-Y \\ H\quad\ \diagdown 3\diagup \\ N \end{array}$$

where X is selected from the group consisting of (a) acyl groups of the formula $C_nH_{2n+1}CO$ where n is an integer from 3 to 5, and (b) compounds selected from the group consisting of:

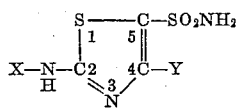

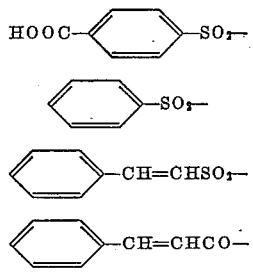

and where Y is selected from the group consisting of hydrogen and methyl.

The new compounds in accordance with this invention are useful chemotherapeutic agents particularly because of their diuretic properties. The compounds can be administered in therapeutic dosages in conventional vehicles as in the form of a tablet, since they are effective when administered orally as well as when injected. Since the alkali metal salts of the compounds of this invention are also readily soluble in an isotonic aqueous medium, injectable solutions can be prepared by dissolving the compounds in the selected medium. The alkali metal salts are stable of themselves, although preservatives may be added if desired.

The dosage of the 2-(substituted amino)-5-sulfamylthiazoles may be varied over a wide range and for this reason, scored tablets containing 100, 150, 250, and 500 milligrams of the active ingredient may be made available to the physician for the symptomatic adjustment of the dosage to the individual patient. These dosages are well below the toxic or lethal dose of the compound.

2-(substituted amino)-5-sulfamylthiazole compounds in accordance with this invention are readily prepared by reacting the desired 2-amino-5-sulfamylthiazole with the chloride of the group which is to be substituted into the amino group in the 2-position. On some occasions the product may be prepared by chlorosulfonation of the appropriate 2-acylaminothiazole, followed by reaction of the resulting sulfonyl chloride with ammonia.

The alkali metal salts of the compounds of this invention are prepared with convenience by dissolving the compound in an aqueous or alcoholic solution of the selected alkali metal hydroxide and, if desired, isolating the salt by removal of the solvent. Any of the conventional alkali metal salts, such as sodium, potassium, lithium or the like salts, can be prepared by this method or by any other method conventionally used and well known to skilled organic chemists.

The preparation of these compounds is more fully described in the following examples. It is to be understood, however, that the examples are illustrative of the methods employed for their preparation and are not to be construed as limiting the invention to the particular reaction conditions specifically described.

EXAMPLE 1

*2-(p-carboxybenzenesulfonylamino)-5-sulfamylthiazole*

A solution of 9.0 gms. of 2-amino-5-sulfamylthiazole in 30 mls. of anhydrous pyridine was cooled (25° C.) while 16.5 gms. of p-carboxybenzenesulfonyl chloride was added in small portions. After standing at room temperature overnight, about one-half of the solvent was removed under reduced pressure on the steam bath. Upon addition of water, the product crystallized. A yield of 14.0 gms. M.P. 273° C. was obtained. This proved to be the pyridinium salt of the desired product. This salt was dissolved in hot water (80 mls.) and 10 mls. of concentrated hydrochloric acid was added. The product crystallized on cooling. The yield of the product M.P. 297–298° C. was 6.6 gms.

An analysis of the product showed that it corresponded closely to the empirical formula $C_{10}H_9N_3O_6S_3$, confirming that the compound was 2-(p-carboxybenzenesulfonylamino)-5-sulfamylthiazole.

EXAMPLE 2

*2-(p-carboxybenzenesulfonylamino)-4-methyl-5-sulfamylthiazole*

By substituting an equimolar quantity of 2-amino-4-methyl-5-sulfamylthiazole (9.7 gms.) for the 2-amino-5-sulfamylthiazole in the foregoing example, there is obtained 3.6 gms. of the product M.P. 298–300° C.

An analysis of the product showed that it corresponded closely to the empirical formula $C_{11}H_{11}N_3O_6S_3$, confirming that the compound was 2-(p-carboxybenzenesulfonylamino)-4-methyl-5-sulfamylthiazole.

EXAMPLE 2A

*2-(p-cyanobenzoylamino)-4-methyl-5-sulfamylthiazole*

A solution of 12.2 gms. of 2-amino-4-methyl-5-sulfamylthiazole was dissolved in 50 mls. of acetone and 10 mls. of pyridine. To this was added 11.5 gms. of p-cyanobenzoyl chloride with cooling and stirring. After standing at room temperature overnight about one-half of the solvent was removed. Addition of water precipitated 15.5 gms. of product having a melting point of 256° C. with decomposition. Recrystallization raised the melting point to 260–262° C.

EXAMPLE 3

*2-benzenesulfonylamino-4-methyl-5-sulfamylthiazole*

When a slight excess of benzenesulfonyl chloride (14.2 g.; 0.08 mole) is reacted with 2-amino-4-methyl-5-sulfamylthiazole (11.6 g.; 0.06 mole) in acetone (50 ml.) and pyridine (10 ml.) after removal of solvents, there is obtained 10.8 gms. of the product M.P. 200–202.5° C. Recrystallization from water raises the melting point to 201–202.5° C.

An analysis of the product showed that it corresponded closely to the empirical formula $C_{10}H_{11}N_3O_4S_3$, confirming that the compound was 2-benzenesulfonylamino-4-methyl-5-sulfamylthiazole.

EXAMPLE 4

*2-cinnamoylamino-4-methyl-5-sulfamylthiazole*

When cinnamoyl chloride (10 gms.) and 2-amino-4-methyl-5-sulfamylthiazole (9.7 gms.) are reacted in acetone-pyridine by substantially the same method described in Example 3, after removal of solvents and purification there is obtained 8.5 gms. of the product M.P. 244–245° C.

An analysis of the product showed that it corresponded closely to the empirical formula $C_{13}H_{13}N_3O_3S_2$, confirming that the compound was 2-cinnamoylamino-4-methyl-5-sulfamylthiazole.

EXAMPLE 5

*2-(β-phenylethenesulfonylamino)-4-methyl-5-sulfamylthiazole*

β-Phenylethenesulfonyl chloride (10.1 gms.) and 2-amino-4-methyl-5-sulfamylthiazole (8.0 gms.) give under conditions similar to those described in Example 3 4.0 gms. of an isopropyl alcohol solvate of 2-(β-phenylethenesulfonylamino)-4-methyl-5-sulfamylthiazole, after recrystallization from isopropyl alcohol.

An analysis of the product showed that it corresponded closely to the empirical formula $C_{12}H_{13}H_3O_4S_3 \cdot C_3H_7OH$, confirming that the compound was the solvate of 2-(β-phenylethenesulfonylamino) - 4 - methyl - 5 - sulfamylthiazole.

EXAMPLE 6

*2-n-butyrylamino-4-methyl-5-sulfamylthiazole*

STEP 1.—PREPARATION OF 2-N-BUTYRYLAMINO-4-METHYLTHIAZOLE

A mixture of 2-amino-4-methylthiazole (28.5 gms.) and n-butyric anhydride (43.4 gms.) was cooled until the initial vigorous reaction had abated. After standing overnight at room temperature the reaction was heated for 2 hours on the steam bath and poured into water. The product was separated and crystallized from heptane. The yield of the product M.P. 80–83° C. was 18.3 gms. Repeated recrystallization raised the melting to 84–85° C.

An analysis of the product showed that it corresponded closely to the empirical formula $C_8H_{12}N_2OS$, confirming that the compound was 2-n-butyrylamino-4-methylthiazole.

STEP 2.—PREPARATION OF 2-N-BUTYRYLAMINO-4-METHYL-5-SULFAMYLTHIAZOLE

The above thiazole (14 gms.) was added to 35 mls. of chlorosulfonic acid and heated on the steam bath for 2 hours at 90° C. The reaction mixture was poured onto ice to destroy excess acid and filtered. The residue was added to 75 mls. of liquid ammonia. When the ammonia had evaporated, the residue was washed with water and crystallized from 25% aqueous alcohol. The yield of product M.P. 163–165° C. was 6.5 gms. Recrystallization from water raised the melting point to 166–167° C.

An analysis of the product showed that it corresponded closely to the empirical formula $C_8H_{13}N_3O_3S_2$, confirming that the compound was 2-n-butyrylamino - 4 - methyl-5-sulfamylthiazole.

EXAMPLE 7

The compositions in accordance with the foregoing Examples 1–6 were tested in order to determine a dosage at which the compounds were effective diuretics. These activity tests are reported in the table below, using fractions which express that part of a full dose at which the compound was active. A full dose is conventionally and arbitrarily set at an initial priming dose of 25 milligrams per kilogram of body weight, followed by an infusion of 30 mg./kg./hr.

| Example | X | Y | Dose (Intravenous) |
|---|---|---|---|
| 1 | $HO_2C$—⟨⟩—$SO_2$ | H | ¼ |
| 2 | $HO_2C$—⟨⟩—$SO_2$ | $CH_3$ | ⅒ |
| 3 | ⟨⟩—$SO_2$ | $CH_3$ | ½ |
| 4 | ⟨⟩—$CH=CHCO$ | $CH_3$ | ½ |
| 5 | ⟨⟩—$CH=CHSO_2$ | $CH_3$ | ¼ |
| 6 | $CH_3CH_2CH_2CO$ | $CH_3$ | ⅒ |

The above tests were run in dogs.

EXAMPLE 8

The product of Example 2 is reacted with an equivalent amount of NaOH, producing the sodium salt of 2-(p-carboxybenzenesulfonylamino) - 4 - methyl - 5 - sulfamylthiazole.

Activity tests in dogs of 2-(p-carboxybenzenesulfonylamino)-4-methyl-5-sulfamylthiazole revealed the compound to be active at ⅒ of the full dose, intravenously, the full dose being conventionally and arbitrarily set at an initial priming dose of 25 milligrams per kilogram of body weight followed by an infusion of 30 mg./kg./hr. The compound is also active when administered orally, only ¼ of the full dose being required, the full oral dose being 30 mg./kg.

Toxicity tests on mice showed the active dose to be far below the lethal dose. The $LD_{50}$ is greater than 600 mg. per kg. of body weight, and represents the least dosage that should kill one-half of the animals receiving the dose.

EXAMPLE 9

Compressed tablet containing 250 milligrams of active ingredient per tablet, in a quantity suitable for fifty tablets:

|  | Grams |
|---|---|
| 2-(p-carboxybenzenesulfonylamino)-5 - sulfamylthiazole | 12.500 |
| Calcium phosphate tribasic | 2.095 |
| Methylcellulose 15 cps. 2%, 3 cc | 0.060 |
| Starch paste 10%, 1 part: gelatine solution 20%, 1 part, 3 cc | 0.450 |
|  | 15.105 |
| Methylcellulose 15 cps | 0.750 |
| Talc, dried | 0.750 |
|  | 16.605 |

2-(p - carboxybenzenesulfonylamino) - 5 - sulfamylthiazole and calcium phosphate tribasic are mixed together and then passed twice through No. 60 bolting cloth. The methylcellulose solution is then added and thoroughly mixed in the granulation and the mixture then passed through a No. 10 screen. The starch-gelatine solution is then added to the granulation, thoroughly mixed, and passed through a No. 10 screen after which the total granulation is oven dried at between about 120 to 130° F. for 16 to 18 hours, and passed through a No. 18 screen. The methylcellulose is passed through a No. 60 bolting cloth onto this granulation and blended thoroughly therewith after which the talc is passed through a No. 60 bolting cloth and also thoroughly mixed with the granulation. The resulting granulation is compressed into tablets having a 13/32″ standard curvature punch yielding 50 tablets having a thickness of 0.155 to 0.160 inch, ten of which weigh 3.321 grams. The tablets have a hardness of 5 to 6 kilograms measured by the Monsanto Chemical Company tablet hardness tester apparatus, and a disintegration time of 12 minutes when tested by the U.S.P. tablet disintegrating apparatus (U.S. Pharmacopoeia, 15th edition, p. 937).

EXAMPLE 10

The following is a suitable mixture, showing appropriate quantities per tablet:

|  | Mgm. |
|---|---|
| 2-(p-carboxybenzenesulfonylamino)-4-methyl-5-sulfamylthiazole | 250 |
| Calcium phosphate tribasic | 40 |
| Starch (as 12.5% starch paste) | 12.5 |
| Total | 302.5 |

To the foregoing, the following mixture is added:

| Corn starch | 15 |
|---|---|
| Magnesium stearate | 2.5 |
| Total weight | 320.0 |

The above ingredients are mixed, bolted, and compressed into tablets in substantially the same manner described in Example 9.

EXAMPLE 11

The following is a suitable mixture, showing appropriate quantities per tablet:

|  | Mgm. |
|---|---|
| 2-benzenesulfonylamino-4-methyl-5-sulfamylthiazole | 250 |
| Calcium phosphate tribasic | 40 |
| Starch (as 12.5% starch paste) | 12.5 |
| Total | 302.5 |

To the foregoing, the following mixture is added:

| Corn starch | 15 |
|---|---|
| Magnesium stearate | 2.5 |
| Total weight | 320.0 |

The above ingredients are mixed, bolted, and compressed into tablets in substantially the same manner described in Example 9.

EXAMPLE 12

The following is a suitable mixture, showing appropriate quantities per tablet:

|  | Mgm. |
|---|---|
| 2-cinnamoylamino-4-methyl-5-sulfamylthiazole | 250 |
| Calcium phosphate tribasic | 40 |
| Starch (as 12.5% starch paste) | 12.5 |
| Total | 302.5 |

To the foregoing, the following mixture is added:

| Corn starch | 15 |
|---|---|
| Magnesium stearate | 2.5 |
| Total weight | 320.0 |

The above ingredients are mixed, bolted, and compressed into tablets in substantially the same manner described in Example 9.

EXAMPLE 13

The following is a suitable mixture, showing appropriate quantities per tablet:

|  | Mgm. |
|---|---|
| 2-($\beta$-phenylethenesulfonylamino)-4-methyl-5-sulfamylthiazole | 250 |
| Calcium phosphate tribasic | 40 |
| Starch (as 12.5% starch paste) | 12.5 |
| Total | 302.5 |

To the foregoing, the following mixture is added:

| Corn starch | 15 |
|---|---|
| Magnesium stearate | 2.5 |
| Total weight | 320.0 |

The above ingredients are mixed, bolted, and compressed into tablets in substantially the same manner described in Example 9.

EXAMPLE 14

The following is a suitable mixture, showing appropriate quantities per tablet:

|  | Mgm. |
|---|---|
| 2-n-butyrylamino-4-methyl-5-sulfamylthiazole | 250 |
| Calcium phosphate tribasic | 40 |
| Starch (as 12.5% starch paste) | 12.5 |
| Total | 302.5 |

To the foregoing, the following mixture is added:

| Corn starch | 15 |
|---|---|
| Magnesium stearate | 2.5 |
| Total weight | 320.0 |

The above ingredients are mixed, bolted, and compressed into tablets in substantially the same manner described in Example 9.

While the above examples have described the preparation of certain specific compounds and a certain specific dosage form suitable for administering the novel compound of this invention in human therapy, it is to be understood that the invention is not to be limited by these examples or by the specific reaction conditions described for the preparation of the compounds or by the specific ingredients included in the pharmaceutical preparation. On the contrary, it is understood that this invention embraces variations and modifications, including the use of equivalent methods of preparation. However, it is also to be understood that this invention is specifically limited to the compounds defined in the claim and does not extend to the substitution of any other groups for those which are specifically defined in the claim.

Having thus described our invention, we claim:

2-(p-carboxybenzenesulfonylamino)-4-methyl-5-sulfamylthiazole.

References Cited in the file of this patent

UNITED STATES PATENTS

| 2,783,240 | Vaughan et al. | Feb. 26, 1957 |
|---|---|---|
| 2,797,225 | Anderson | June 25, 1957 |

OTHER REFERENCES

Bogomolev et al.: Chem. Abstracts, vol. 48, col. 8654 (1954).